United States Patent [19]

Thoma

[11] Patent Number: 5,189,999
[45] Date of Patent: Mar. 2, 1993

[54] DEVICE FOR ADJUSTING THE RELATIVE ANGLE OF ROTATION OF A SHAFT TO A DRIVE WHEEL, ESPECIALLY THE CAMSHAFT OF AN INTERNAL COMBUSTION ENGINE

[75] Inventor: Josef Thoma, Munich, Fed. Rep. of Germany

[73] Assignee: Bayerische Motoren Werke AG, Fed. Rep. of Germany

[21] Appl. No.: 838,196

[22] PCT Filed: Aug. 30, 1990

[86] PCT No.: PCT/EP90/01442

§ 371 Date: Mar. 6, 1992

§ 102(e) Date: Mar. 6, 1992

[87] PCT Pub. No.: WO91/03628

PCT Pub. Date: Mar. 21, 1991

[30] Foreign Application Priority Data

Sep. 6, 1989 [DE] Fed. Rep. of Germany ....... 3929621

[51] Int. Cl.[5] .................... F01L 1/34; F16D 3/10; F16H 35/08; F15B 15/17
[52] U.S. Cl. .................. 123/90.17; 123/90.31; 123/90.33; 123/198 C; 123/90.12; 74/568 R; 74/567
[58] Field of Search ............. 123/90.15, 90.17, 90.31, 123/90.12, 90.33, 198 C, 196 R; 464/2, 160; 74/568 R, 567

[56] References Cited

U.S. PATENT DOCUMENTS

| | | | |
|---|---|---|---|
| 3,643,642 | 2/1972 | Junes | 123/198 C |
| 4,561,390 | 12/1985 | Nakamura et al. | 123/90.17 |
| 4,873,949 | 10/1989 | Fujiyoshi et al. | 123/90.12 |
| 5,012,773 | 5/1991 | Akasaka et al. | 123/90.31 |
| 5,063,895 | 11/1991 | Ampferer | 123/198 C |
| 5,085,181 | 2/1992 | Feuling | 123/90.12 |

FOREIGN PATENT DOCUMENTS

| | | |
|---|---|---|
| 3616234 | 11/1987 | Fed. Rep. of Germany . |
| 2-45408 | 10/1990 | Japan ............ 123/90.17 |

Primary Examiner—E. Rollins Cross
Assistant Examiner—Weilun Lo
Attorney, Agent, or Firm—Evenson, Wands, Edwards, Lenahan & McKeown

[57] ABSTRACT

A device for adjusting a relative angle of rotation of a camshaft with respect to a drive wheel of an internal combustion engine utilizes a hydraulic linear motor for actuation. A hydraulic pump with a pump rotor is axially arranged with respect to a longitudinal or adjustment axis of the linear motor.

18 Claims, 1 Drawing Sheet

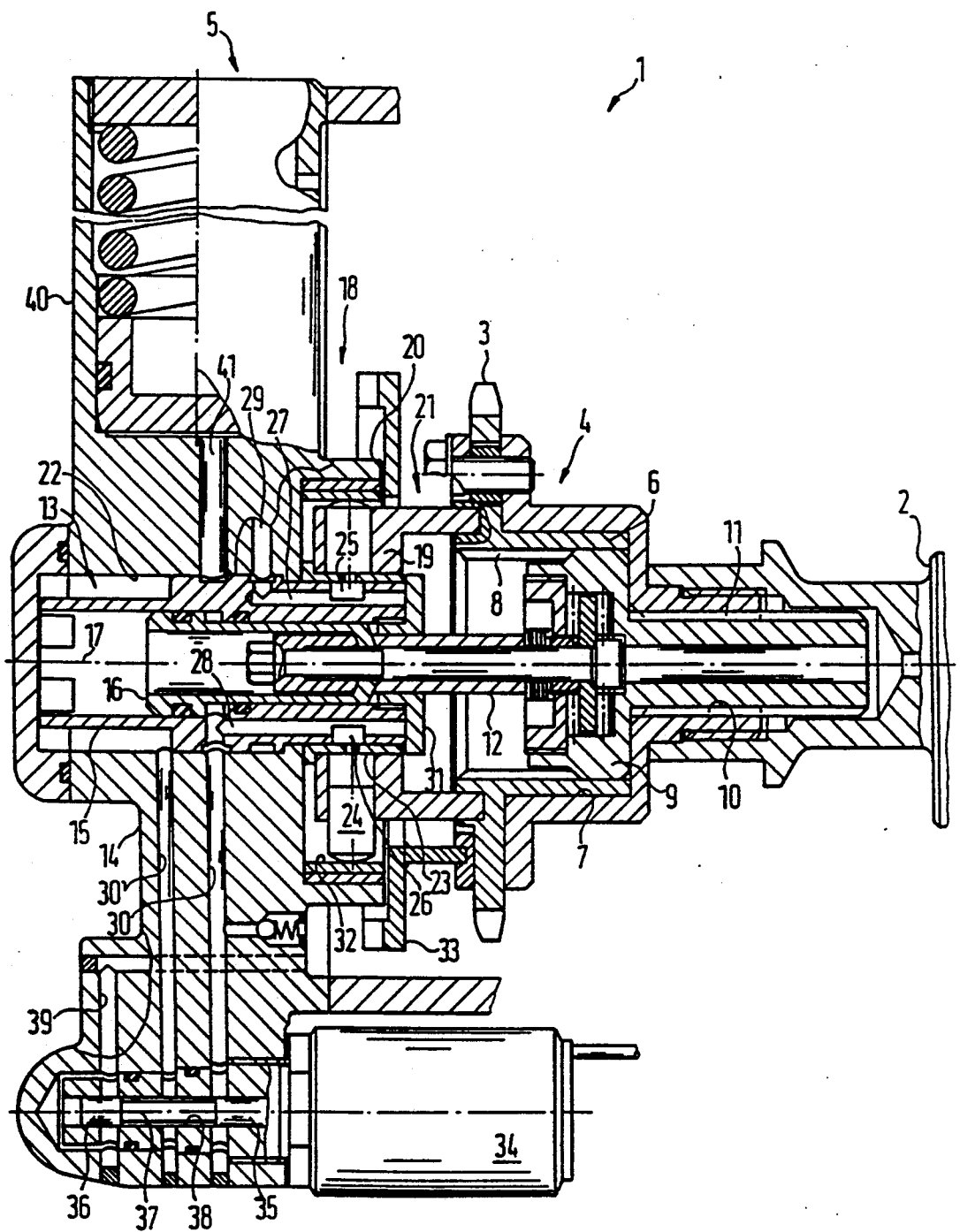

DEVICE FOR ADJUSTING THE RELATIVE ANGLE OF ROTATION OF A SHAFT TO A DRIVE WHEEL, ESPECIALLY THE CAMSHAFT OF AN INTERNAL COMBUSTION ENGINE

BACKGROUND AND SUMMARY OF THE INVENTION

The present invention relates to a device for adjusting a relative angle of rotation of an internal combustion engine camshaft to a drive wheel and, more particularly, to a device in which a hydraulic linear motor is the actuating arrangement which acts upon an actuating mechanism between the drive wheel and the camshaft.

A device of this general type is known, for example, from EP-A-0 245 791 wherein the linear motor interacts with an adjusting mechanism which is used essentially in a front-face recess of the angularly adjustable shaft or camshaft. To this adjusting mechanism, which insignificantly influences the overall length of the internal-combustion engine, the linear hydraulic motor is assigned on a detachable engine power section cover with integrated hydraulic pipes and a control device for utilizing the space to the front-face end of the adjustable shaft or of the adjusting mechanism. The actuating of the linear hydraulic motor takes place by a hydraulic system which is separate from the internal combustion engine and has a separately driven pump.

In addition, a device has been suggested for adjusting the relative angle of rotation of a shaft to a drive wheel as seen in EP-A-0 363 600 in which a rotor of a hydraulic motor, which interacts with the adjusting mechanism of a first adjustable camshaft of an internal-combustion engine, is acted upon by the delivered flow of a hydraulic pump driven by a second camshaft. In this device, the hydraulic pump and the hydraulic motor, including the hydraulic pipes, form a unit which is assigned to the above-mentioned shafts and which is integrated in a power section area of the internal-combustion engine which is used for driving the shafts.

The present invention is based on the object of combining a device of the above-mentioned type with a hydraulic pump such that a compact space-saving unit is achieved for the structural integration in or on the internal combustion engine.

This object has been achieved in accordance with the present invention by such that a hydraulic pump with a pump rotor is arranged coaxially with respect to the longitudinal or adjustment axis of the linear motor.

The combination of the hydraulic pump, also known as a hydrostatic pump, and the linear motor in a coaxial arrangement advantageously results in a compact space-saving unit. This unit may, at the same time, serve as the smallest structural or assembly unit. For achieving a particularly compact space-saving unit, the linear motor and the hydraulic pump are arranged coaxially with respect to the shaft with the adjustable angle of rotation on a detachably constructed engine power section cover, in which case the unit according to the present invention and the engine power section cover form the next larger structural or assembly unit. In this arrangement, parts of the unit according to the present invention comprising the hydraulic pump and the linear motor may be an integral component of the engine power section cover. However, a separate construction of the unit according to the invention and of the engine power section cover is also conceivable.

The present invention can be implemented particularly advantageously by the selection of a radial piston pump and a linear motor constructed as a cylinder/piston unit. The radial piston pump, which is relatively small in size but has a sufficient delivered flow and a very high delivery pressure, therefore promotes the compact construction of the unit, in which the selected construction of the linear motor permits a good constructional adaptation to the selected radial piston pump. Consequently, an especially advantageous embodiment is achieved by the arrangement of the radial piston pump on the engine power section cover on the side of the shaft, in which the pump rotor is disposed in a rotatably movable manner on the periphery of the cylinder of the linear motor. For this extremely compactly configured unit, the drive of the radial piston pump can be achieved elegantly by simple devices by providing a radial piston pump which is acted upon on the inside and has a pump housing which is constructed in the engine power section cover, is open on the shaft side, and receives the pump rotor which is in a shaft-side driving connection by way of a plug-in arrangement. When the plug-in arrangement is in parallel to the mounting direction, the suggested plug-in arrangement considerably promotes the mounting of the structural or assembly unit according to the invention.

The unit combined according to the invention and comprising a pump rotor of the hydraulic pump or of the radial piston pump which is disposed on the cylinder of the linear motor in a rotatably movable manner results in special advantages with respect to its manufacture and the mounting of details. This results because a separate cylinder of the linear motor, which is constructed with different outside diameters, is arranged in a step bore of the engine power section cover, and the cylinder, on the shaft side, is equipped with flanged bushes for the slidable bearing of the pump rotor receiving radially displaceable delivery pistons, in which construction the flanged bushes comprise control openings on the intake side and the delivery side which are distributed on the periphery for the connection with the inflow and outflow chambers arranged in the cylinder wall.

The development of functional units of the hydraulic pump or of the radial piston pump in the wall of the cylinder of the linear motor results in additional simplification because the inflow chamber and the outflow chamber are each connected with an essentially axially directed duct which is arranged in the cylinder wall, in which this duct is connected by way of a circumferential groove in the periphery of the cylinder of the linear motor with a pipe arranged in the engine power section cover. If, in addition, the above-mentioned ducts are arranged from the shaft-side end of the cylinder in its cylinder wall, a flanged nut can be assigned to the cylinder on the shaft-side end for the tight sealing of the intake duct and of the delivery duct which also, with its outer edge area, is used for the axial securing of the flanged bush for the rotatably movable bearing of the pump rotor on the cylinder.

For radial piston pumps, which are acted upon on the inside and have a delivery piston which is radially movable in the pump rotor, the interaction of their radially outer ends with a sliding ring arranged in the pump housing is known. For a pump housing, which is constructed in the engine power section cover and is open on the shaft side, a separate fixing of the position of this slide ring is not required because, in a further development embodiment of the present invention, a generator wheel may be assigned with axial play to the pump housing which is open on the shaft side. In this embodiment, the generator wheel may be, for example, in a non-rotatable connection with the plug-in arrangement for the pump rotor. However, the generator wheel may also be constructed in one piece with the pump rotor, in which case the axial assignment of the pump rotor to the pump housing integrated in the engine power section cover may be implemented by the plug-in arrangement.

Further embodiments of the invention relate to the arrangement of the hydraulic pipes in the engine power section cover, in which configuration, for avoiding a separate hydraulic system, for example, the intake pipe in the engine power section cover is connected with the lubricant circulating system of the internal-combustion engine. For a continuous adjustment with a secure holding of the piston in any desirable position in the angle of rotation, the piston of the linear motor is constructed as a differential piston, in which pressure lines, which are provided so that this differential piston is acted upon on both sides, are controlled by a timing valve, in which case hydraulic liquid gradually shut off by the timing valve, by way of a discharge pipe in the engine power section cover which leads out on the side of the engine, is returned to the lubricant circulating system of the internal combustion engine. In addition, the outer dimensions of a hydraulic pump can be desirably reduced by the combination with an accumulator, in which configuration the accumulator is preferably integrated on the engine power section cover for avoiding separate pipes.

Furthermore, in order not to disadvantageously influence the dimensioning of important parts in the overall arrangement for the purpose of an acceptable mounting process, the structural or assembly unit according to the present invention further comprises a coupling element of the adjusting system which is connected by a coupling rod and acts in an angle adjusting manner between the shaft and the drive wheel. Thus, a significant function unit of the overall device can be constructed separately from the internal-combustion engine and can be introduced into the assembly line of the internal-combustion engine.

It remains within the scope of the present invention to arrange the hydraulic pump also on the shaft which can be adjusted with respect to its angle of rotation, and to hold the pump housing to be non-rotatable on the cover side by way of a plug-in arrangement. It is also conceivable to arrange the linear pump, the hydraulic pump, possibly with the generator wheel, and the control device formed of lines and the timing valve in a separate part and to connect this part with the engine power section cover. This development also permits the separate manufacture of a function unit of the overall device. This development may be used for a low-cost retrofitting.

BRIEF DESCRIPTION OF THE DRAWING

These and further objects, features and advantages of the present invention will become more apparent from the following detailed description of a presently preferred embodiment when taken in conjunction with the accompanying sole FIGURE which is a cross-sectional axial view of the adjusting device.

DETAILED DESCRIPTION OF THE DRAWING

A device designated generally by numeral 1 for adjusting the relative angle of a camshaft 2 of an internal combustion engine (not shown in detail), with respect to a drive wheel 3 comprises an adjusting mechanism 4 and an actuating arrangement 5. The drive wheel 3 of the adjusting mechanism 4 is in a one-piece connection with a hollow hub 6 which, by way of the periphery, is movable with respect to its angle of rotation in a recess 7 on the outside of the shaft. Helical or a screwed gearing 8 allows the hollow hub 6 to interact with a coupling link 9 which, in a recess 10 on the interior side of the camshaft, 2 via a slide bar 11, is non-rotatably connected with the camshaft 2. For adjusting the relative angle of rotation of the camshaft 2 with respect to the drive wheel 3, the coupling link 9 can be axially displaced, in which construction a coupling rod 12 connects the coupling link 9 with a hydraulic linear motor 13 of the actuating arrangement 3.

The linear motor 13 is arranged in a detachably constructed engine power section cover 14 and comprises essentially a cylinder 15 and a piston 16 displaceable therein. A hydraulic pump 18 with a pump rotor 19, configured here as a radial piston pump, is arranged coaxially with respect to the longitudinal or adjustment axis 17 of the linear motor 13 on the engine power section cover 14 on the shaft side, in which configuration the pump rotor 19 is arranged to be rotatably movable on the periphery of the cylinder 15 of the linear motor 13. The hydraulic pump 18 is preferably provided as a radial piston pump which is acted upon on the inside. The pump 18 has a pump housing 20 which is constructed in the engine power section cover 14, is open on the shaft side and receives the pump rotor 19, which is in a shaft-side driving connection, by way of a plug-in arrangement 21. For achieving a structural or assembly unit which has manufacturing advantages and is formed of the linear motor 13, the hydraulic pump 18 and the engine power section cover 14, the engine power section cover 14 has a step bore 22 for receiving a separate cylinder 15 of the linear motor 13 which is constructed with different outside diameters. The cylinder 15 arranged in the step bore 22, on the shaft side, is equipped with a flanged bush 23 for the slidably movable bearing of the pump rotor 19 receiving radially displaceable delivery pistons 24. The flanged bush 23 has intake-side and delivery-side control openings arranged to be distributed along the periphery for the connection with inflow and outflow chambers 25 and 26 arranged in the cylinder wall. The inflow chamber 25 and the outflow chamber 26 are each connected with an essentially axially directed respective duct 27 and 28 arranged in the cylinder wall. Each duct 27, 28, by way of a circumferential groove constructed on the periphery of the cylinder 15 of the linear motor 13, is connected with a pipe 29 and 30 arranged in the engine power section cover 14. The intake duct 27 and the delivery duct 28 are closed on the shaft-side end of the cylinder 15 of the linear motor 13 by a flanged nut 31 which, with its outer edge area, is used for the axially securing the flanged bush 23 for the pump rotor 19 on the cylinder 15.

The pump housing 20, which is open on the shaft side and arranged eccentrically with respect to the longitudinal or adjusting axis 17 of the linear motor 13 in the engine power section cover 4, is equipped with a sliding ring 32 which interacts with the delivery piston 24 and is axially secured by a generator wheel 33 arranged with axial play in the plug-in arrangement 21. The generator wheel 33 may be a separate component but it may also be constructed in one piece with the pump rotor 19. Preferably each generator wheel 33 interacts with a generator (not shown) which is arranged in the engine power section cover 14.

In order to avoid a separate hydraulic circuit for the hydraulic actuating arrangement 5, the intake pipe 29 in the engine power section cover 14 is connected with the lubricant circulating system of the internal-combustion engine (not shown in detail). Furthermore, two pressure pipes 30 and 30' provided in the engine power section cover 14 for acting on both sides of a piston 16, e.g. a differential piston, of the linear motor 13, which is constructed with different surfaces, are controlled by a timing valve 34. An annulus 38 provided between the control pistons 35 and 36 of the control rod 37 of the timing valve 34 can be connected with a discharge pipe 39 leading out on the machine side.

The timing valve 34 is connected with a preferably characteristic-diagram-controlled control device by way of which the camshaft 2, for each operating point of the internal-combustion engine, is adjusted in its angle of rotation with respect to the drive wheel and the adjusting angle is held which is determined for the respective operating point. In order to be able to use a hydraulic pump 18 for such a control that has a relatively small size because of the limited space, an accumulator 40 may be arranged on the engine power section cover 14 which, via a connecting pipe 41, is in a medium-carrying connection with the circumferential groove assigned to the pressure duct 28 in the cylinder wall.

In order to facilitate the mounting of the device 1 for adjusting the relative angle of rotation of the camshaft 2 with respect to the drive wheel 3, the structural or assembly unit, which comprises the actuating arrangement 5 with the linear motor 13 and the hydraulic pump 18 as well as the engine power section cover 14, may also comprise the coupling link 9 of the adjusting mechanism 4 which is connected via the coupling rod 12 and adjusts the angle between the camshaft 2 and the drive wheel 3. This avoids additional assembly measures for the device 1 arranged on the internal-combustion engine.

Within the scope of the present invention, the hydraulic pump may also be arranged on the shaft with the adjustable angle of rotation, and the pump housing of the hydraulic pump may be held non-rotatably on the side of the cover by a plug-in arrangement. In addition, it may also be provided within the scope of the invention that the linear motor, the hydraulic pump—possibly with the generator wheel—and a control device comprising the timing valve with the lines are arranged in a separate part which can be connected with the engine power section cover. In this configuration, the separate part may serve as a retrofit kit.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A device for adjusting a relative angle of rotation of a shaft with respect to a drive wheel, particularly the camshaft of an internal combustion engine, comprising a hydraulic linear motor constituting an actuating arrangement which
   acts upon an adjusting mechanism acting between the drive wheel and the shaft, wherein
   a hydraulic pump with a pump rotor is operatively arranged coaxially with respect to one of a longitudinal and adjustment axis of the linear motor.

2. A device according to claim 1, wherein
   the linear motor and the hydraulic pump are arranged coaxially to the shaft with the adjustable angle of rotation on a detachably constructed engine power section cover, and together therewith
   form a structural or assembly unit.

3. A device according to claim 1 characterized in that the hydraulic pump is a radial piston pump.

4. A device according to claim 1, wherein the linear motor is a cylinder/piston unit.

5. A device according to claim 3, wherein the radial piston pump is arranged on the engine power section cover on the shaft side, and
   the pump rotor is disposed in a rotatably movable manner on the periphery of the cylinder of the linear motor cylinder/piston unit.

6. A device according to claim 3, wherein the radial piston pump is provided which is acted upon on the inside and has a pump housing constructed in the engine power section cover, is open on the shaft side and
   receives the pump rotor which, by way of a plug-in arrangement, is in a shaft-side driving connection.

7. A device according to claim 4, wherein a separate cylinder of the linear motor, which is constructed with different outside diameters, is arranged in a step bore of the engine power section cover, and
   the cylinder, on the shaft side, is equipped with a flanged bush for the slidably movable bearing of the pump rotor which receives radially displaceable delivery pistons, and
   the flanged bush has intake-side and delivery-side control openings distributed along the periphery for connection with a respective inflow and outflow chamber arranged in the cylinder wall.

8. A device according to claim 7, wherein the inflow chamber and the outflow chamber are each connected with an essentially axially directed duct arranged in the cylinder wall, and
   each duct, by way of a circumferential groove constructed on a periphery of the cylinder of the linear motor cylinder/piston unit is connected with a pipe arranged in the engine power section cover.

9. A device according to claim 8, wherein, on the shaft-side end, a flanged nut closes off the intake duct and the delivery duct and is assigned to the cylinder of the linear motor,
   said flanged nut, with its outer edge area, being used for axially securing the flanged bushing on the cylinder.

10. A device according to claim 6, wherein a generator wheel is operatively associated with axial play to the pump housing open on the shaft side.

11. A device according to claim 10, wherein the generator wheel is in one piece with the pump rotor.

12. A device according to claim 8, wherein the pipe in the engine power section cover is connected with a lubricant circulating system of the engine.

13. A device according to claim 2, wherein pressure pipes provided in the engine power section cover for two-sided acting upon a piston of the linear motor configured with different surfaces, are controlled by a timing valve,
an annulus provided between control pistons of a control rod of the timing valve being operatively connected with a discharge pipe leading out on the machine side.

14. A device according to claim 8, wherein an accumulator is arranged on the engine power section cover which,
by way of a connecting line, is connected in a medium-carrying manner with the circumferential groove assigned to the duct in the cylinder wall.

15. A device according to claim 2, wherein the structural or assembly unit comprising the actuating arrangement with the linear motor and the hydraulic pump as well as the engine power section cover comprises a coupling link of the adjusting mechanism which is connected by way of a coupling rod and adjusts the angle between the shaft and the drive wheel.

16. A device according to claim 1, wherein the hydraulic pump is arranged on the shaft with the adjustable angle of rotation, and the pump housing is non-rotatably held on the cover side by a plug-in arrangement.

17. A device according to claim 1, wherein the linear motor, the hydraulic pump and a control device are arranged in a separate part which can be connected with the engine power section cover.

18. A device for adjusting the relative angle of rotation of a camshaft with respect to a drive wheel of an internal combustion engine,
comprising a linear hydraulic motor configured as an actuating arrangement which
is operatively associated with an adjusting mechanism acting between the drive wheel and the camshaft,
and a piston pump arranged coaxially with respect to one of a longitudinal and adjusting axis of the linear hydraulic motor and has a reciprocating piston which is penetrated in the center by a cylinder of the linear hydraulic motor.

* * * * *